(12) United States Patent
Yamashita

(10) Patent No.: US 10,773,889 B2
(45) Date of Patent: Sep. 15, 2020

(54) METHOD OF FULFILLING ORDERS IN A WAREHOUSE WITH AN ORDER FULFILLMENT AREA

(71) Applicant: Dematic GmbH, Heusenstamm (DE)

(72) Inventor: Shin Yamashita, Oberursel (DE)

(73) Assignee: Dematic GmbH, Heusenstamm (DE)

( * ) Notice: Subject to any disclaimer, the term of this patent is extended or adjusted under 35 U.S.C. 154(b) by 102 days.

(21) Appl. No.: 15/774,445

(22) PCT Filed: Nov. 4, 2016

(86) PCT No.: PCT/EP2016/076634
§ 371 (c)(1),
(2) Date: May 8, 2018

(87) PCT Pub. No.: WO2017/080914
PCT Pub. Date: May 18, 2017

(65) Prior Publication Data
US 2018/0319592 A1    Nov. 8, 2018

(30) Foreign Application Priority Data
Nov. 9, 2015 (EP) ..................... 15193616

(51) Int. Cl.
*B65G 1/137* (2006.01)
*G06Q 10/08* (2012.01)
*B65G 1/04* (2006.01)

(52) U.S. Cl.
CPC ......... *B65G 1/1373* (2013.01); *B65G 1/0492* (2013.01); *G06Q 10/087* (2013.01)

(58) Field of Classification Search
CPC .. B65G 1/1373; B65G 1/1375; B65G 1/1376; B65G 1/1378; B65G 1/0492; G06Q 10/087; G06Q 10/08
See application file for complete search history.

(56) References Cited

U.S. PATENT DOCUMENTS 6,011,998 A * 1/2000 Lichti .................. B65G 1/1376
414/268
8,790,061 B2    7/2014 Yamashita
(Continued)

FOREIGN PATENT DOCUMENTS

DE    29912230 U1    11/1999
EP     1590272 B1     8/2010
(Continued)

OTHER PUBLICATIONS

International Search Report of the International Searching Authority from corresponding Patent Cooperation Treaty (PCT) Application No. PCT/EP2016/076634, indicated completed on Dec. 6, 2016.
(Continued)

*Primary Examiner* — Glenn F Myers
(74) *Attorney, Agent, or Firm* — Gardner, Linn, Burkhart & Ondersma LLP

(57) ABSTRACT

A method of fulfilling orders in a warehouse with an order fulfillment area comprising the steps—storing slow-moving items in a first storage comprising mobile shelf units, automated transportation of slow-moving items needed for order fulfillment on the mobile shelf units from the first storage to an unloading station, where at least one of the slow-moving items needed for a certain order is manually transferred into a receptacle, routing of the receptacles directly to picking stations if needed right away, otherwise routing of the receptacles to a second storage and storing the receptacles therein. When all of the items to complete an order are available and/or are stored in the second storage, retrieving the receptacles containing items for fulfillment of the certain order and transporting to one of the picking stations for specific item retrieval for fulfilling the certain order.

20 Claims, 8 Drawing Sheets

(56) References Cited

U.S. PATENT DOCUMENTS

| | | | |
|---|---|---|---|
| 8,973,506 B2 | 3/2015 | Yamashita | |
| 8,974,168 B2 | 3/2015 | Yamashita | |
| 9,266,675 B2 | 2/2016 | Yamashita | |
| 9,452,886 B2 | 9/2016 | Yamashita | |
| 9,522,781 B2 | 12/2016 | Hortig et al. | |
| 9,630,777 B2 | 4/2017 | Yamashita | |
| 9,785,911 B2* | 10/2017 | Galluzzo | B25J 5/007 |
| 9,950,863 B2* | 4/2018 | O'Brien | B65G 1/1373 |
| 2004/0193311 A1* | 9/2004 | Winkler | B65G 1/1378 |
| | | | 700/216 |
| 2009/0136328 A1* | 5/2009 | Schafer | B65G 1/1378 |
| | | | 414/273 |
| 2009/0185884 A1* | 7/2009 | Wurman | B65G 1/1378 |
| | | | 414/270 |
| 2011/0008137 A1 | 1/2011 | Yamashita | |
| 2011/0295413 A1 | 12/2011 | Hara et al. | |
| 2013/0302132 A1* | 11/2013 | D'Andrea | G06Q 10/08 |
| | | | 414/807 |
| 2014/0180468 A1* | 6/2014 | Winkler | G06Q 10/0875 |
| | | | 700/216 |
| 2014/0244026 A1* | 8/2014 | Neiser | B65G 1/1373 |
| | | | 700/216 |
| 2014/0249666 A1* | 9/2014 | Radwallner | B65G 1/1378 |
| | | | 700/216 |
| 2014/0288696 A1* | 9/2014 | Lert | B65G 1/0492 |
| | | | 700/216 |
| 2016/0107838 A1* | 4/2016 | Swinkels | B66F 9/063 |
| | | | 414/273 |
| 2017/0043953 A1* | 2/2017 | Battles | B65G 1/1373 |

FOREIGN PATENT DOCUMENTS

| | | |
|---|---|---|
| EP | 2170742 B1 | 10/2012 |
| WO | 2012044734 A1 | 4/2012 |
| WO | 2015007513 A1 | 1/2015 |

OTHER PUBLICATIONS

Written Opinion of the International Searching Authority from corresponding Patent Cooperation Treaty (PCT) Application No. PCT/EP2016/076634, indicated completed on Dec. 6, 2016.

International Preliminary Examination Report from corresponding Patent Cooperation Treaty (PCT) Application No. PCT/EP2016/076634, dated Feb. 20, 2018.

Submission to EPO from corresponding Patent Cooperation Treaty (PCT) Application No. PCT/EP2016/076634, dated Dec. 20, 2017.

* cited by examiner

METHOD OF FULFILLING ORDERS IN A WAREHOUSE WITH AN ORDER FULFILLMENT AREA

CROSS REFERENCE TO RELATED APPLICATION

The present application claims the priority benefits of International Patent Application No. PCT/EP2016/076634, filed on Nov. 4, 2016, and claims benefit of EP 15193616.8, filed on Nov. 9, 2015.

BACKGROUND OF THE INVENTION

The invention relates to a method of fulfilling orders in a warehouse with an order fulfillment area.

When operating a warehouse with an order fulfillment area several aspects must be taken into account as described below.

While picking or compiling orders from transporting units, such as e.g. articles or containers, it is necessary to provide the transporting or storage units, which are associated with a common order, in a directed or sorted fashion. In addition, it is conventional to intermediately store (buffer) the transporting units of an order, until all of the transporting units required for the order are present. They are then passed together onto a collecting line which leads them e.g. to the palletization area, picking station, goods issue, shipment etc.

At the picking station the goods for fulfilling an order are taken from the storage units (receptacles) and placed according to the order into an order container etc. The storage unit (often called donor) is then routed back into the racking storage and stored until needed for the next order.

Order fulfillment of orders placed over the Internet must take place within a relatively short period of time in order to be commercially competitive. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a barcode or radio frequency identification (RFID) tag that identifies the SKU of the item.

Because of the large number of SKU's from which an order may be selected, the inventory warehouse may be very large in footprint. As such, it is common to designate geographic portions of the inventory warehouse to each be picked by an individual picker such that each picker picks only a portion of each order, since each order may be spread out over the entire general footprint of the inventory warehouse. Each picker is directed by a warehouse management system to pick portions of a number of orders using a various picking technology known in the art. It is efficient to have the picker mix several orders in one picking or picked receptacle rather than having multiple receptacles, each bearing one order portion. In this way, each order may be contained in a number of picked receptacles if the order contains more than an individual item. However, it is then necessary to subsequently sort the contents of the picked receptacle(s) to the order and to process the items so that they can be packed-out for shipment via courier. Also, orders may be made up of items having various physical characteristics such that some items are not able to be readily handled by a conventional material-handling system. Such items are known as non-conveyables.

EP 1 590 272 B1 discloses use of mobile inventory pods in the form of autonomous robotic mobile trays that store and transport inventory items based on instructions from a central computer.

EP 2 170 742 B2 discloses a method in which at a singulation station of a materials handling facility, individual units of items from collections of items are selected, wherein the collection of items includes units of heterogeneous items picked from inventory storage of the materials handling facility to fulfill a plurality of orders; associating an item identifier of a particular item of the individual units of items with a receptacle identifier of a particular conveyance receptacle of a plurality of conveyance receptacles; associating the particular conveyance receptacle with a particular order that specifies at least one unit of the particular item. In Other words articles from a mixed or dirty batch picking process are singulated by putting a single separate article into/onto a conveyance receptacle and marrying these by correlating their identifiers in a database. From then on only the receptacle identifier is tracked throughout the facility.

US 2011/0295413 A1 also discloses singulation of batch wise picked items from a batch container into single containers with a single item per container.

Further it is difficult to manage fluctuations in demand within storage facilities. Manually run storage facilities with manual pack stations usually capable of managing the fluctuation and have low initial costs and can be very effective for very slow moving articles in general and fast moving particularly across limited articles and low cost labor situations. However they must be larger in space to handle the same amount of orders as automated high bay systems. In addition, it is difficult to control the progress of manual operations in the timely fashion and running cost and even availability of labor may become an issue in high cost labor situations.

Slow-movers are items which are infrequently asked for in orders and therefore have longer storage duration. In contrast fast-moving items are items which are frequently used for order fulfillment and therefore have short storage duration.

Common procedure is to store both such slow-moving and fast-moving products within the same automated storage system. If the amount of so-called slow-moving products is high, it means that a lot of storage locations within the automated storage system are occupied with items that are rarely needed. If only so-called fast movers are stored in the automated storage system, it is necessary to provide a second storage. Both situations increase costs as storage locations have to be provided. Further, if slow moving products are stored within manual shelving, an operator needs to walk around and pick those products manually. Since those are slow movers, the operator has to spend a majority of his time walking to the location where products are stored rather than for the picking operation itself. Batch picking would be the most effective way to minimize the walking distance per pick but still a great amount of walking time is required and also the separation of the batch picked items is tiresome and causes require duplicate handling of the products, one for the batch pick and one for the separation from the batch pick.

SUMMARY OF THE INVENTION

The object of the invention is to provide a method of order fulfilling, which allows effective and space saving order fulfillment.

In accordance with the invention, it has been recognized that an effective and space saving order fulfillment may be performed, if storage of items, especially slow-moving items, in a first storage comprising mobile shelf units, automated transportation of items needed for order fulfillment on said mobile shelf units from said first storage to an unloading station, where at least one of the items needed for a certain order is manually or automatically unloaded from the mobile shelf unit and directly transferred into a receptacle, if needed right away routing of the receptacles directly to picking stations, otherwise routing of the receptacles to a second storage and storage of the receptacles therein, when all of the items to complete an order are available and/or are stored in the second storage, retrieval of the receptacles containing items for fulfillment of the certain order and transport to one of the picking stations for specific item retrieval for fulfilling the certain order.

In other words, the transportation of the (e.g. slow-moving) items from their storage to the picking station(s) is accelerated by automation making use of an extra storage for such items flexible. Therefore the picker does not spend a majority of his time walking to the location where products are stored and bringing them to the unloading station but rather than for the picking operation itself.

The first storage comprises mobile units, especially automatic guided vehicles for automated transportation of the items to the unloading station. This allows a highly automated transportation and even retrieval as well as storage of the slow-moving items.

It is possible to use mobile inventory pods as described in EP 1 590 272 B1 in this context. Such mobile inventory pods are actually robotic shelves that autonomously move throughout the storage to deliver items on shelves to predetermined offload positions. It is preferred that the mobile units carry only items of a single type. In contrast however to EP 1 590 272 B1 order fulfillment (picking) itself is not performed by picking directly off the mobile shelves.

At the unloading station the operator manually takes one or more items off the mobile shelves and places the items directly into receptacles that are then directly inducted into the further system. This is performed in a single step. In this way the number of item handling steps (touches) can be reduced and operator efficiency is improved as well as the error rate is lowered.

At the unloading station two or more identical items may be placed into a same receptacle. This saves space especially within storage and lessens use and logistics of receptacles. Similarly, it is possible for two or more items belonging to the same aisle or area of an automated second storage to be placed into the same receptacle at the unloading station. Also, two or more items belonging to the same order are placed in each receptacle at the unloading station.

Therefore eight or less items may be for example placed in the receptacles depending upon type of item (color, size, weight etc.). This allows for reduction of the number of items in a receptacle to a level that allows the personnel (or device) at the pack station to effectively choose the item needed at that picking station for fulfillment of an order out of the multiple items in the receptacle. This choice can be facilitated by purposely mixing highly different items. Some receptacles may be directly routed to picking stations if needed right away. Picking stations include put-walls and/or fully or semi-automated picking stations and/or automated palletizers. Alternatively, receptacles may be routed to and buffered in an automated second storage for later retrieval.

Receptacles which are not-emptied at picking stations may be routed to further picking stations or conveyed back into storage, preferably to the automated second storage. In other words, receptacles which still contain item(s) are routed back to storage rack or directly to next picking stations. This process is continued until the receptacles are emptied of items. Then the receptacles may be returned to the unloading station for reuse. This may be performed manually or via conveyors etc. It is preferred that fast-moving items are stored in the automated second storage.

The automated second storage may comprise a three-dimensional racking for storage of receptacles with shuttles servicing each aisle and preferably each level, wherein the shuttles themselves have load handling means which allow transfer of receptacles directly between adjoining racks by pushing or pulling the receptacles from a source rack location of a first rack to a destination rack location of an adjoining second rack. Therefore, use of dedicated ASRS (automated storage and retrieval systems) is not necessary. Each such aisle may be connected to a picking station. The automated storage facility may be partially or fully automated. The automated second storage may further comprise a sequencer or buffer. It may be connected to the picking stations.

The unloading station and the second storage and/or the picking stations may be connected by a routing conveyor. For example, as disclosed by WO 2015/007513 A1. This area of the routing conveyor may include a manual storage and picking area. The manual picking area can be used not only to pick very slow movers and very fast movers in the economical and also efficient fashion, but also to cope with peak periods in demand and can, on the other hand, be switched off when not needed. This allows keeping the automated second storage in an optimal utilization range. Also the manual picking area relieves the automated second storage of some of the storage volume. It is also possible to use the automated second storage to decouple the order fulfillment process between manual picking and packing.

The automated second storage is usually arranged downstream from the manual picking area (in turn downstream from the first storage and unloading station) and is connected to the manual picking area by a routing conveyor, which also leads to a shipping area. Therefore the routing conveyor connects all areas and may serve as a dispatch conveyor of complete orders to a shipping area.

The manual picking area comprises manual pack stations arranged along the extension of the routing conveyor and supplying the routing conveyor with receptacles picked at the manual pack stations. The manual pack stations are also supplied by the routing conveyor with receptacles.

The manual pack stations may be of any kind and an operator can pick items from any storage media, e.g. pallet flow rack or static location for very fast movers, flow rack for fast movers, shelves for slow movers, pick walls etc. located nearby the station.

The manual picking stations in the manual picking area may be used to supply donor and/or batch receptacles for replenishment of the automated second storage, which are filled with multiple identical items and are transported and stored in the storage and retrieval racking area. For example the replenishment receptacles may be filled with very fast movers from a flow rack. Those items are often assigned to the order(s) before such an operation takes place so operator can pick and put an exact quantity so as not to leave residual quantity in the storage rack.

The term "receptacles" includes totes, trays, containers, paperboard containers, carton boxes etc. If not denoted otherwise receptacles may be of the donor type containing inventory stored and not allocated to any order, in other words items are picked from these receptacles; or batch type containing items to be picked for an order/orders and already allocated to an unfulfilled order/orders, from the unloading station or manual pack stations in the manual picking area; or order type containing picked items, i.e. containing completed orders or orders in progress.

Some or all receptacles may be subdivided into compartments, so that transport and choice of items are facilitated. Non-subdivided receptacles may be used to induct single or even multiple items. This is more flexible for putting items with differing dimensions into the same receptacle. If the receptacles are subdivided, the compartments may be of equal and/or differing size. Usually such compartments make sense for small items therefore large number of items can be put in single receptacle. The batch receptacles may be subdivided into eight or less compartments. The subdivision may be performed by radially centered walls within the container etc. or by angular walls within the receptacles. Obviously not all receptacles need be subdivided in the same manner and several different kinds of subdivided receptacles can be used as required in parallel or divider arrangement can also be changed dynamically at the unloading station.

In accordance with the invention a hybrid solution is proposed, which allows applications with high fluctuation rates of demand or order fulfillment or existence of very slow movers or limited number of very fast movers to be best served.

It is also possible to supply extremely fast-moving items directly at picking stations for either performing direct order fulfillment or replenishment of donor receptacles. This can take place via pallets or carton flow racks etc., as indicated above. The automated first storage facility comprises a storage racking comprising a plurality of multilevel storage racks in which order and/or product units are stored, wherein the storage racks are disposed back-to-back in pairs and have an aisle between pairs. In other words the racks have an aisle between them and each rack abuts a rack of a neighboring aisle.

All receptacles are fed into the storage racking by at least one storage-entry conveyor and retrieved by at least one storage-exit conveyor. Preferably one storage-entry conveyor and one storage-exit conveyor are provided for each aisle.

Each storage racking aisle is serviced by at least one automatic storage and retrieval device (AS/RS) for storage and retrieval of receptacles from the storage. Preferably each level of each aisle has a dedicated AS/RS machine but also AS/RS devices serving two and more levels are possible.

Receptacles are exchanged directly between two adjoining storage racks from a source storage rack to an adjacent destination storage rack via cross conveyance locations in the storage racks themselves. This allows sorted retrieval from storage in a simpler manner and without sortation outside of the aisles. This reduces technical complexity and space, lowers cost and achieves better reliability.

In accordance with the invention, it has been also recognized that when receptacles are exchanged directly between two adjoining storage racking units from one rack of a storage racking aisle to an adjacent rack of a next storage racking aisle via cross conveyance locations in the storage racking units, distribution and/or complex sorting in the front-zone can be omitted, since the receptacles are already stored in a single storage rack aisle even if initially they were stored elsewhere. When retrieved from storage, they are simply retrieved in sequence. Therefore a direct transfer of receptacles without distribution or sorting outside of the aisles can be achieved without "crossing" conveyors and this with a simpler and smaller technical installation with smaller space and higher reliability. The receptacles can therefore just be retrieved from the respective aisle in the required sequence. This allows for reduction of the so-called front-zone installations. The storage is preferably a fully automated storage.

In other words, storage racking locations of abutting racks are used for passing receptacles from one side of the racking through to the next, so that the transporting units can be transferred from one racking to the next. So, the automated second storage comprises a three dimensional storage of receptacles with AS/RS servicing each aisle and possibly each level, wherein the AS/RS themselves have load handling means which allow transfer of receptacles directly between adjoining racks by pushing or pulling the receptacles from a source rack location of a first rack to a destination rack location of an adjoining second rack, and optionally each aisle is connected to a pack station. Therefore, cross conveyance or sorting is possible inside the racking units themselves and accordingly it is possible to dispense with "cross conveyance" in the front-zone completely.

If necessary, the use of a front zone conveyor for cross conveyance can be combined with this concept especially if the front zone conveyor cannot be omitted for other reasons than cross conveyance, while reducing the complexity and throughput requirements of the front zone conveyor and control system. In an expedient manner, the cross conveyance locations are provided in each level or any selected level of the storage racking units. Particularly effective path-time optimization is achieved if the cross conveyance locations are disposed closer to inbound and outbound conveyor line. It is also possible to locate cross conveyance locations at different positions within a level. The cross conveyance locations can also be used as buffers, especially if they belong to final destination aisle of the receptacles, i.e. the transporting or storage units remain therein, until they are actually needed or retrieved.

The exchange within the cross conveyance locations can be effected actively or passively with regard to the AS/RS, i.e. on the one hand the cross conveyance location can be simply a passive storage surface, on which the AS/RS of one aisle deposits receptacles (places them into storage) and from which the AS/RS of the adjacent aisle receives receptacles (removes them from storage). For each racking storage location or cross conveyance location this procedure can always be performed in one direction only or in both directions.

Preferably the automatic storage and retrieval device itself displaces the receptacles in the cross conveyance locations, i.e. it is most preferred that the AS/RS itself is the active handling means, i.e. the receptacles are handled only by the AR/RS also for exchange in the cross conveyance locations and these do not have any kind of own drive means.

By reason of the simplicity of the cross conveyance locations it is also possible to subsequently retrofit or refit cross conveyance locations and to adapt flexibly to the level of efficiency required in the storage system simply by changing normal racking positions accordingly.

For exchange purposes, the AS/RS can likewise place receptacles in double-depth storage or multiple-depth storage in the cross conveyance location. The AS/RS of one aisle can thus place the receptacles in storage in the cross conveyance locations to such a depth that they are already to be assigned to the adjacent racking and can be reached "normally" by the AS/RS, in other words the automatic storage and retrieval device of a source rack places the receptacles into the cross conveyance location in an adjacent destination rack. In addition, the load receiving means, e.g. telescopic arms, can have an extended range. It is also possible to use a stacked storage of receptacles. Since the cross conveyance locations are subject to be utilized extensively and to reduce damage of receptacles, it is expedient if the floors of the cross conveyance locations be coated to reduce friction. Also structural reinforcement can be implemented.

It is particularly preferable if the AS/RS are "miniloads" or single-level racking serving units. In particular shuttles or satellite vehicles are preferred. A "miniload" AS/RS is a floor run multilevel storage and retrieval machine with a flexible load handling device that supports a wide range of individual articles, bundled or stacked articles, containers, trays, cartons of different sizes and weights. Also shuttles with a stacked arrangement of two load handling platforms or an elevating platform are to be used in connection with the invention for handling several levels from a single rail.

The shuttle can be used in two arrangements, a so called "captive" or "roaming" arrangement. In the captive arrangement the shuttle stay in their respective level. In the roaming alternative the shuttle change levels as required.

It is thus possible in accordance with the invention to achieve a particularly high level of retrieval efficiency whilst fully maintaining the desired sequence of transporting or storage receptacles in any aisle. This is also achieved with considerably less technical work than in accordance with the Prior Art.

At least one lifting device is used, in order to transfer receptacles to the at least one storage-exit conveyor, i.e. the lift allows for level changes of receptacles coming from the storage-entry conveyor or destined to the storage-exit conveyor. Usually this will be a stationary lift, but also AS/RS with lift functions (e.g. mini-load) could be envisioned. The at least one lift is optionally of the drive-through-type, meaning that receptacles may pass through the lift within the rack, as if it were a conveyor.

In a preferred embodiment a lift is installed in each rack of an aisle and each lift is either an inbound-lift connected to the storage-entry conveyor or an outbound-lift connected to the storage-exit conveyor or inbound and outbound-lift connected to both storage-entry and storage-exit conveyor.

Possible lifts include in particular vertical conveying means. It is favorable if each lift has one or more, in particular two, locations/positions for receptacles. It is also beneficial if each level of the storage racking has at least one buffer location for decoupling the single-level AS/RS and the lift. This renders it possible to fully utilize the quicker single-level AS/RS and to prevent empty-running of the lift.

It is also advantageous if each lift has a separately driven conveying means for each location. In particular, it is then advantageous if each lift has two locations which are each provided with a separately driven conveying means movable in different directions. Therefore, the transfer of two receptacles for each level can always be effected simultaneously in different directions or onto different outbound buffers, e.g. to the left and right. In addition, the reception of the receptacles onto the lift is preferably controlled so that two receptacles are discharged onto one level. This is possible on account of the high efficiency of the shuttles used, since the transfer locations (buffer location) to the lift are practically always occupied, so that for the control of the lift there is provided a selection option which allows the lift to be occupied accordingly by receptacles for different buffers of one level.

The automated second storage may also be connected to at least one fully or semiautomatic picking station for picking from donor receptacles into order receptacles for fulfilling orders, to which receptacles are fed by the at least one storage-exit conveyor and from which receptacles are dispatched by the at least one storage-entry conveyor. It is also possible to use several fully or semiautomatic picking stations and especially one for each aisle.

In the present application a fully automated order picking station is defined as a picking station according to the goods-to-person principle with fully automated receptacle handling, i.e. a fully automated supply and discharge and presentation of the receptacles. Empty order receptacles and receptacles with picking goods are automatically supplied to the station. Receptacles are placed in ergonomically optimal height on the pack station. Usually such a station will also incorporate means for directing, instructing and controlling as well as supervising the picker (e.g. pick-to-light etc.), who will still manually pick out of donor receptacles into order receptacles. As an option, the operator may be replaced with an automated picking device/machine to realize a fully automated picking process. In contrast a semiautomatic picking station will not have the fully automated receptacle handling just described, but will involve manual processing of receptacles.

The automated first second storage facility may also be connected to automated palletizers.

To fulfill orders a routing conveyor is connected to the at least one inbound storage-entry conveyor and/or the at least one storage-exit conveyor of the storage racking. This allows:

- order receptacles containing completed orders coming from the storage racking of the automated first storage facility to be dispatched via the routing conveyor to a shipping area;
- order receptacles containing completed orders coming from the fully or semiautomatic picking station of the automated first storage facility to be dispatched via the routing conveyor to a shipping area or to be inducted into the storage racking via the at least one storage-entry conveyor for later dispatch;
- receptacles containing partial orders coming from the unloading station to be introduced into the storage racking of the automated first storage facility via the at least one storage-entry conveyor for further processing or to be routed to a picking station;
- receptacles containing partial orders coming from the storage racking of the automated first storage facility to be dispatched to a picking station via the at least one storage-exit conveyor to be introduced;
- receptacles containing partial orders coming from the fully or semiautomatic picking station to be introduced into the storage racking of the automated storage and retrieval racking area or routed to next packing station for further processing;
- Donor receptacles containing newly received items coming from the unloading station to be introduced into the storage racking of the automated storage and retrieval racking area;
- Donor receptacles containing newly received items coming from the unloading station to be routed to picking station for "replenishment by opportunity";
- Donor receptacles containing newly received items coming from the unloading station to be routed to a manual picking area for replenishment;
- Empty receptacles coming from the picking station to be sent back to unloading station.

This may allow either immediate or controlled order release depending on the necessities.

The automatic storage and retrieval device (AS/RS) may be fed by an inbound-buffer and may feed into an outbound-buffer, wherein the buffers are arranged within storage racks, and the cross conveyance locations are arranged preferably but not limited to directly behind/next to the inbound-buffer and/or outbound-buffer of a corresponding storage rack.

Further it is possible to form a conveyor loop with the at least one storage-entry conveyor, the at least one lift and the at least one storage-exit conveyor, wherein the at least one lift is fed by the storage-entry conveyor and itself feeds the storage-exit conveyor. Then the outbound-buffer may feed into the conveyor loop and inbound-buffer can be fed by the conveyor loop. The pack station should be incorporated into the loop.

Preferably the routing conveyor has either one or two levels per each picking level and there may be more than one picking level. In a particularly preferred embodiment the lower level routing conveyor supplies partial order and/or donor receptacles from the storage racking of the automated first storage facility to the fully or semiautomatic picking station and the upper level routing conveyor returns partial or completed order and/or donor receptacles to the storage racking of the automated first storage facility. Then it is possible that the lower level routing conveyor supplies empty receptacles to the fully or semiautomatic picking station. The other way around is also possible, meaning that upper level routing conveyor supplies partial order and/or product units as well as handing empty receptacles and lower level routing conveyor returns partial order/donor receptacles.

A single level conveyor is preferred when there is no need for handling order totes within the system, then donor receptacles can be retrieved one after another in the sorted fashion and no empty order unit must be handled.

The order or donor receptacles can be placed in storage randomly ("chaotically") being distributed over the entire system without knowledge of the subsequent sequence when they are retrieved. In contrast to DE 299 12 230 U1 no restriction as to possible modules or storage areas is required.

The invention is further characterized by a high degree of flexibility, since the inbound and outbound feeding lines can be connected to the corresponding lifts at any points.

In parallel with the outbound lifts, it is likewise possible to provide dedicated inbound lifts with correspondingly supplying distribution feeding lines. On the other hand, it is also possible to control the outbound lifts such that in addition to the outbound operation they can also be used as inbound lifts. In the reverse scenario, optionally present dedicated inbound lifts can also be used as outbound lifts according to requirement. In the event of malfunctions of individual lifts, this also permits uninterrupted operation or an increase in system efficiency. To this end, the inbound or outbound lines must be disposed between the lift and racking at different heights. This requires the presence of two similar combined inbound and outbound levels, the collecting lines of which are brought together after passing the last outbound line in sequence.

The transverse displacement function, i.e. the exchange of receptacles within the cross conveyance locations in the rack by the AS/RS itself, offers the advantage that, in the event of a malfunction of e.g. an outbound lift/inbound lift or feeding lines, the function of the relevant aisle can be maintained.

Further features and details of the invention are apparent from the description hereinafter of the drawings.

DESCRIPTION OF THE PREFERRED EMBODIMENTS

Figure 1:
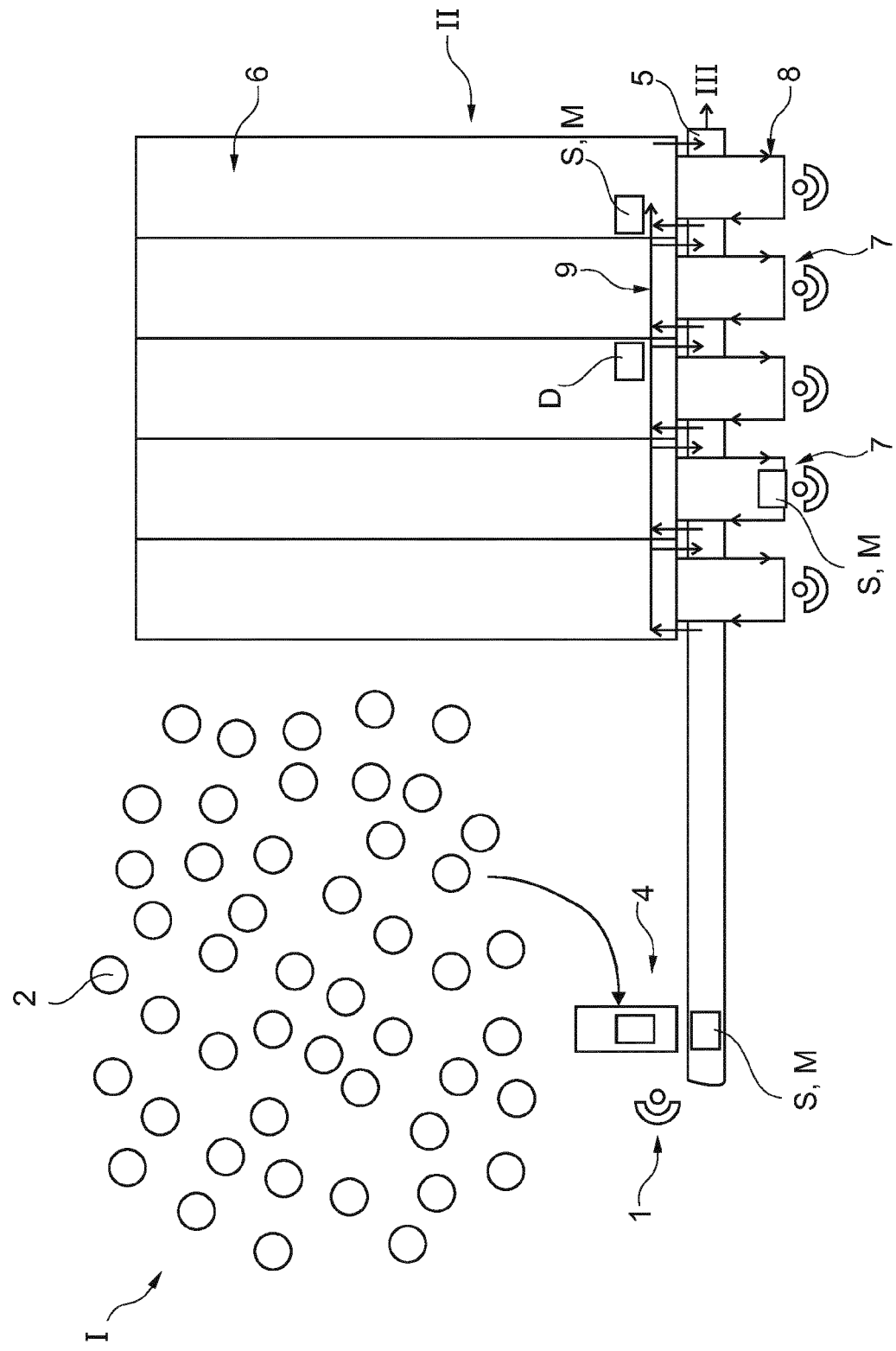
FIG. 1 shows a schematic plan view of an order fulfillment area in warehouse with storage of fast-moving items in an automated second storage and storage of slow-moving items in a first storage.

In FIG. 1 a schematic plan view of an order fulfillment area in warehouse with a first storage area I and with an automated second storage area II is shown. The automated second storage II is arranged downstream from the first storage area I and is connected by a routing conveyor 5, which eventually leads to a shipping area IV. First storage area I comprises autonomous mobile shelf units 2, as described in EP 1 590 272 B1, for storage and transportation of slow-moving articles.

The mobile shelf units 2 perform automated transportation of slow-moving items needed for order fulfillment on said mobile shelf units from said first storage area to an unloading station 4, where at least one of the slow-moving items needed for a certain order is manually transferred into a receptacle. Obviously several unloading stations may be incorporated even though only one 1 is shown.

Receptacles are placed on the routing conveyor 5 which inducts them into the further system. This operation is performed in a single step, improving operator efficiency. Placement can be done by either separating each item or product in a single container etc. or placing multiple products into subdivided containers etc.

The mobile shelf units 2 carry only items of a single kind and are instructed by warehouse management system (database) which unloading station 4 to navigate to and which specific mobile shelf unit 2 is to do so based upon items needed and distance to unloading station etc.

At the unloading station 4 items may be singularly placed into single receptacles S (S for single) by operator 1. Alternatively at least two items are placed in a batch receptacle M. Usually eight or less items will be placed in the batch receptacles M depending upon type of item (color, size, weight etc.). This allows for reduction of the number of items in a receptacle M to a level that allows the personnel at picking station 7 to effectively choose the item needed at that picking station for fulfillment of an order out of the multiple items in the batch receptacle M (M for multiple).

Multiplication is generally done in such a way that it is done from the same tote/section so that the routing of the batch tote will be minimized or under certain circumstances (when the destination of items put in the batch tote happens to be the same) eliminated.

The batch receptacles M are then routed (on conveyor 5) to and stored in an automated second storage 6 for later retrieval. Some may be directly routed to the picking stations if needed right away. Therefore the batch and single receptacles M, S are a kind of donor receptacle D (see below).

When all of the individual items to complete an order are available, the stored receptacles S, M are retrieved and transported to picking stations for specific item retrieval for a certain order assigned to that picking station, where retrieved items are packed with other retrieved items of an order for order fulfillment, as will be discussed in detail later on.

The receptacles S, M are routed to next destination, typically a storage aisle where the next order is executed via either routing conveyor 5 or cross conveyance locations Q within the storage racking. This process is continued until the receptacles are emptied of items. Then the receptacles may be returned to the unloading station 4 for reuse.

Many of the embodiments below have similar or like devices, installations etc. which are therefore indicated by same reference numerals.

Figure 5:
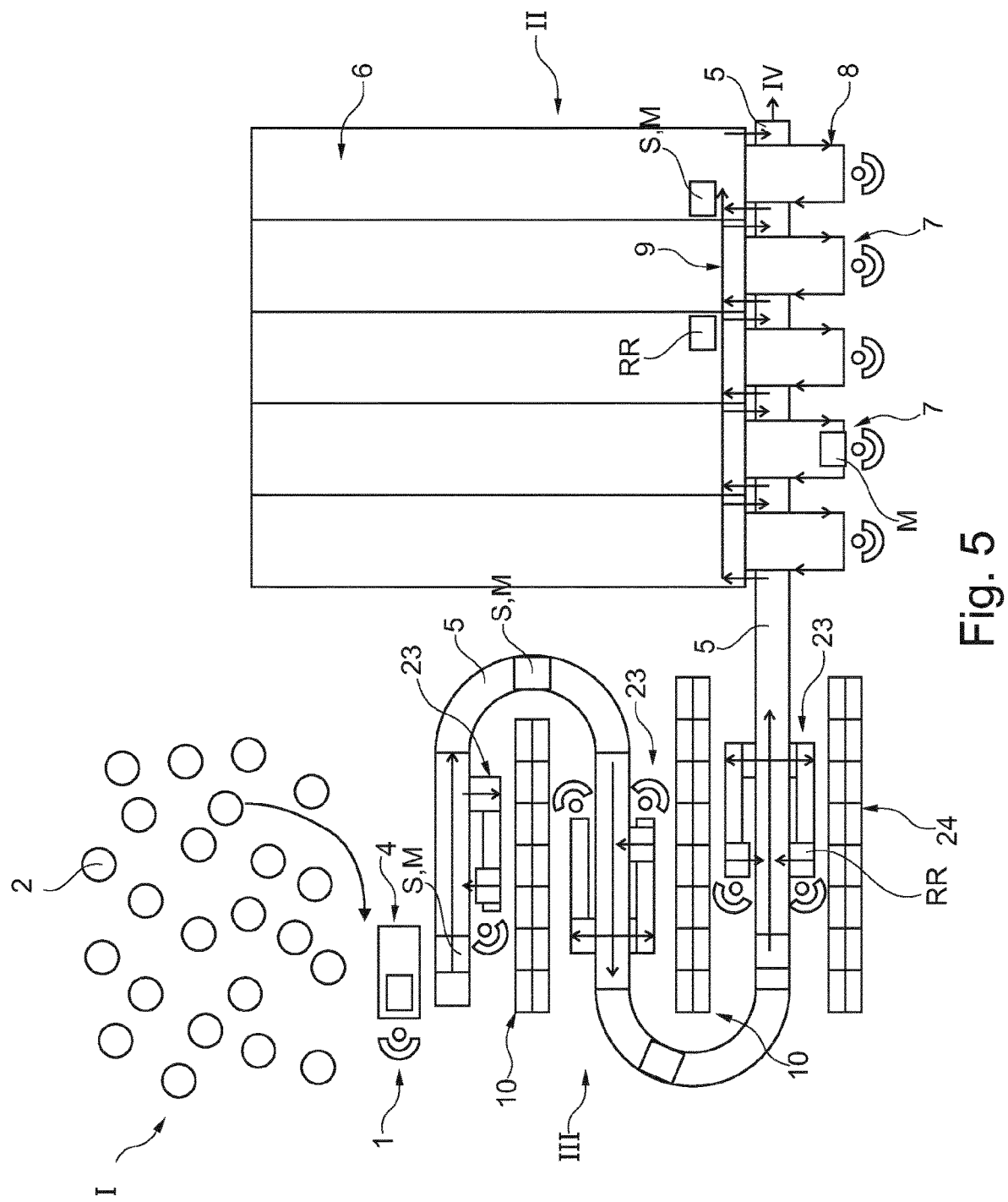
FIG. 5 shows a schematic plan view of an order fulfillment area in warehouse comprising a manual storage and picking area.

In FIG. 5 an alternative schematic plan view of an order fulfillment area in warehouse is shown. The automated second storage II is arranged downstream from the first storage area I and is connected to a manual storage and picking area III by a routing conveyor 5, which eventually leads to a shipping area IV. Essentially the embodiment of FIG. 5 is the same as in FIG. 1 with the addition of manual storage and picking area III. The manual storage and picking area is used for picking, intermediate storage, replenishment etc.

The other way round is also possible, the automated storage and retrieval racking area II would then be arranged upstream from the manual picking area I and connected to the manual picking area I by a routing conveyor 5, and the end of the routing conveyor would lead to a shipping area IV.

The manual storage and picking area III is supplied by the unloading station 4 as described above. As before receptacles S, M are routed (on conveyor 5) to and stored in automated second storage 6 for later use. Some may be directly routed to the pack stations if needed right away. The routing conveyor 5 however travels through manual storage and picking area II, where the receptacles may be used to perform operations.

The manual storage and picking area II comprises manual picking stations 23 supplied and arranged along the extension and on one or both sides of the meandering routing conveyor 5 and supplying the routing conveyor 5 with receptacles picked at the manual picking stations 23.

The picking stations 23 are connected to the routing conveyor by conventional conveying technology, like roller or belt conveyors, located close to storage shelves 10 from which certain products may be picked and placed into order receptacles. The picking stations 23 are either operated separately or by two pickers at the same time.

Alternatively, "pace belt pick" can be used instead of zone picking station 23 with zone routing conveyors. "Pace belt pick" will have a straight routing conveyor with no zone diverting system and the order units will run on this at consistent pace. The picker picks required articles and put them into the order receptacles on the fly within each picking zone. Otherwise, the conveyor stops until product is inducted.

The picking stations 23 may also be used for supply of donor receptacles for replenishment of the automated storage and retrieval racking II, which are filled with multiple identical items and are transported and stored in the storage and retrieval racking area. For example the replenishment receptacles RR may be filled with very fast movers from a flow rack 24.

Figure 2:
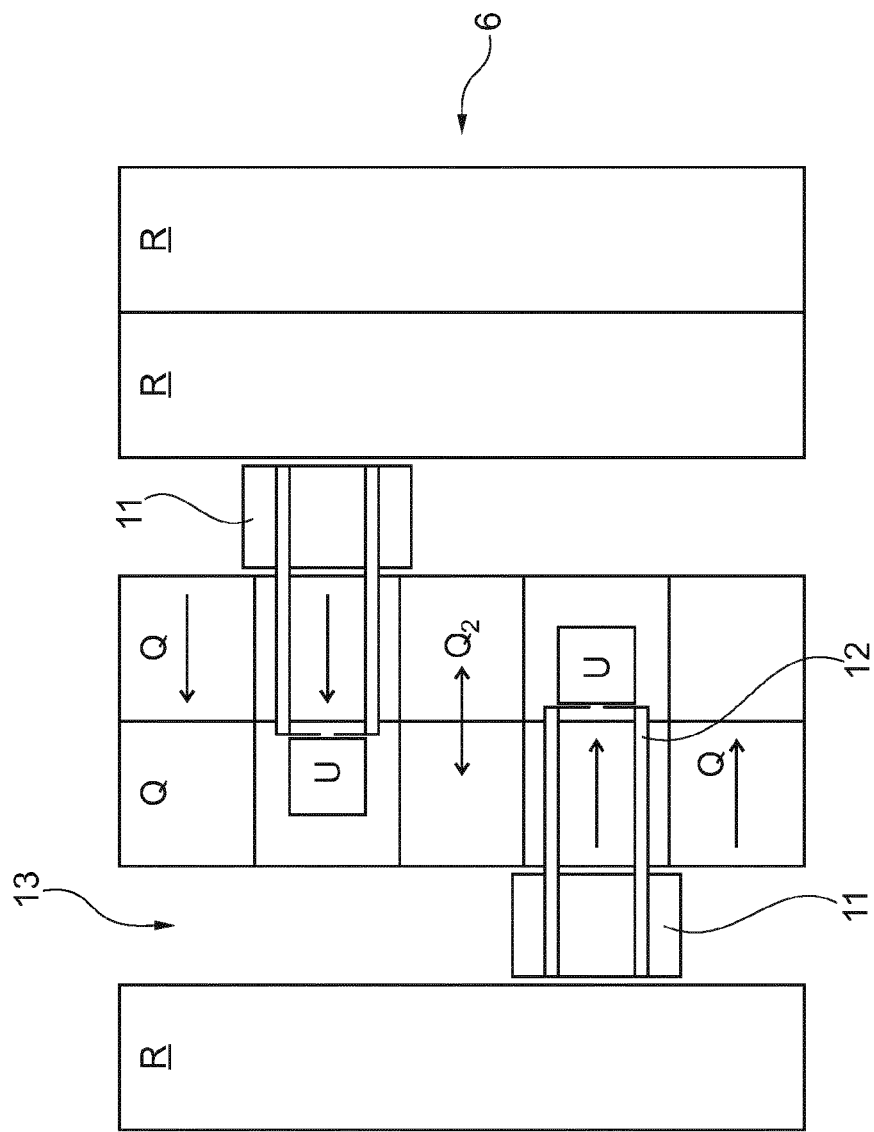
FIG. 2 shows a typical schematic plan view of exchange of transport units between racks within the racking storage in the automated second storage of FIG. 1.

The automated storage and retrieval racking area II comprises a storage racking 6 comprising a plurality of multi-level storage racks R in which receptacles, in general designated with U, are stored. The storage racks R are disposed back-to-back in pairs and have an aisle 13 between pairs (see also FIG. 2). The aisles 13 are connected to semi or full-automated picking stations 7 through conveyor installations 8, which encompass at least one storage-entry conveyor 14 provided for feeding order and/or product receptacles U into the storage racking 6, R, and at least one storage-exit conveyor 15 provided for retrieval of order and/or product receptacles U from the storage racking 6, R.

So the semi/full automatic picking station 7 for picking from product receptacles D (D for donor) into order receptacles O (O for order) for fulfilling orders are fed by the at least one storage-exit conveyor 15 and order and/or product receptacles are returned to the storage rack by the at least one storage-entry conveyor 14.

The routing conveyor 5 is also connected to the at least one inbound storage-entry conveyor 14 and the at least one storage-exit conveyor 15.

Each storage racking aisle 13 has one automatic storage and retrieval device in the form of a shuttle 11 provided in each level or each few levels for storage and retrieval of order and/or product receptacles in the storage racks R.

Order and/or product receptacles U are exchanged directly between two adjoining storage racks R from a source storage rack to an adjacent destination storage rack via cross conveyance locations Q in the storage racks themselves (see FIG. 2), which can be one way exchange locations Q or bidirectional.

The shuttle 11 itself displaces the order or product receptacles U in the cross conveyance locations Q actively with its load handling means 12, which are telescopic arms on both sides of a loading platform and are equipped with unit handling levers. There is no active drive means within the racks R themselves. The shuttle 11 of a source rack places the order or product receptacles U into the cross conveyance location Q in an adjacent destination rack, so that the shuttle operating in the according, neighboring aisle can handle the unit by normal deep operation. In other words, the sourcing shuttle operates deeper than for normal single or double deep storage, e.g. triple deep for exchange. Therefore it is possible to transfer receptacles U through the storage racking 6 in the sense of arrow 9 without leaving the storage.

Figure 3:
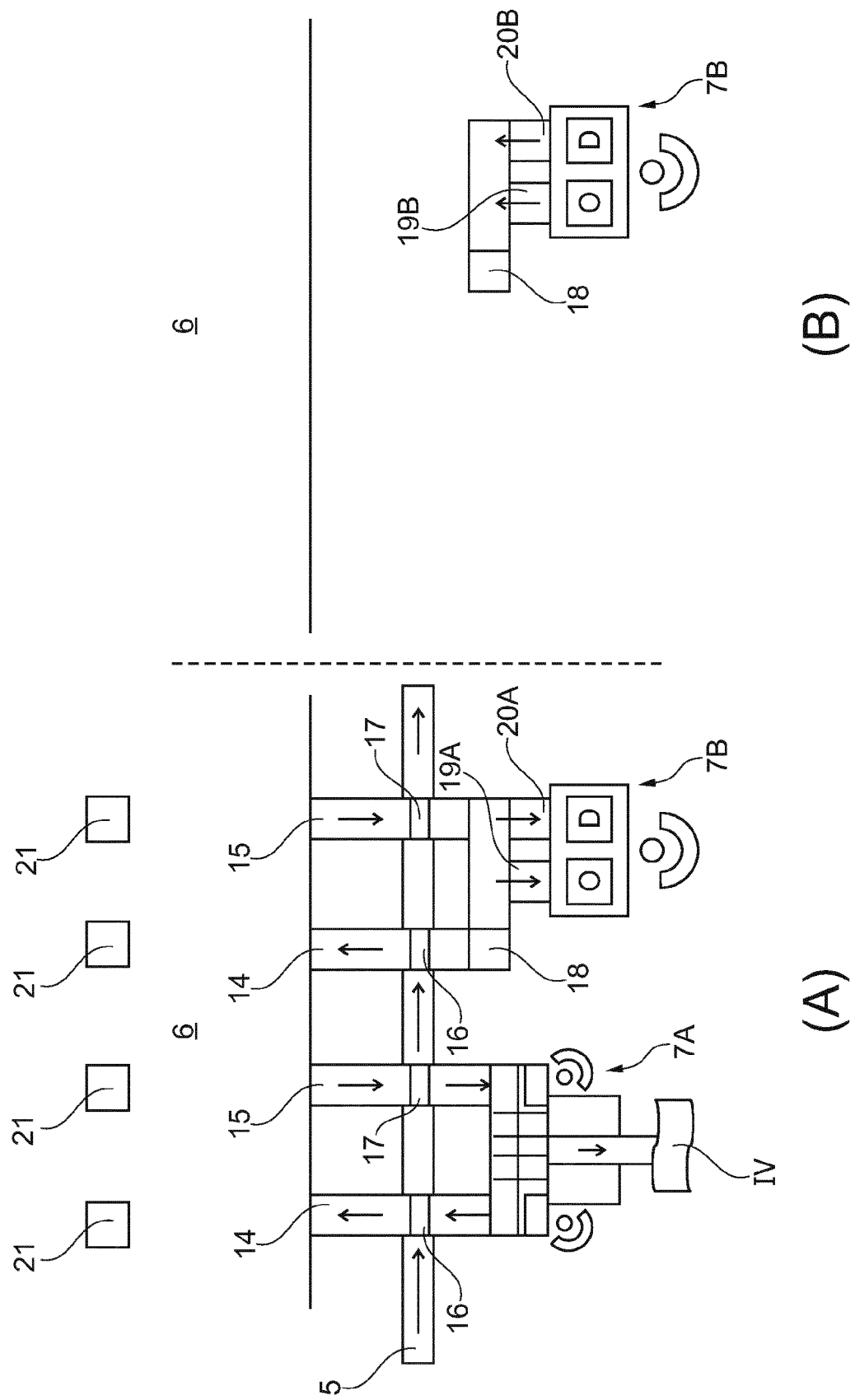
FIG. 3 shows a typical schematic plan view of a first and second picking level with a single level routing conveyor.

According to FIGS. 3 (and 4) and 7 the semi/full-automated picking stations 7 may have many different configurations. In FIG. 3 the semi-automated picking station 7A (left hand side) is directly connected to an aisle 13 of the storage racking 6 via one storage-entry conveyor 14 and one storage-exit conveyor 15, which in turn are connected/pass through the routing conveyor 5 by right-angle-transfer-devices 16, 17, also called RAT in the art.

The semi-automated picking station 7A incorporates one/two work places for pickers and in between a dispatch conveyor for direct dispatch of complete orders to the shipping area IV. Such a station is ideal for small orders as in e-commerce.

Alternatively or in addition full-automated picking stations 7B may be used, which is arranged in such a way as to receive order receptacles O and product receptacles D in level A via one storage-entry conveyor 14 and one storage-exit conveyor 15, which in turn are connected/pass through the routing conveyor 5 by right-angle-transfer-devices 16, 17, as before, but end in servicing conveyors 19A for order receptacles O and 20A for product or donor receptacles D.

However the dispatch of the order receptacles O and product or donor receptacles D is performed by servicing conveyors 19B for order receptacles O and 20B for product or donor receptacles D on a higher level B (right hand side). This is achieved by a level changing conveyor device 18 which routes onto the storage-entry conveyor 14 on level A.

The routing conveyor 5 has only one level in level A and can be used to supply complete orders to the shipping station IV.

Figure 4:
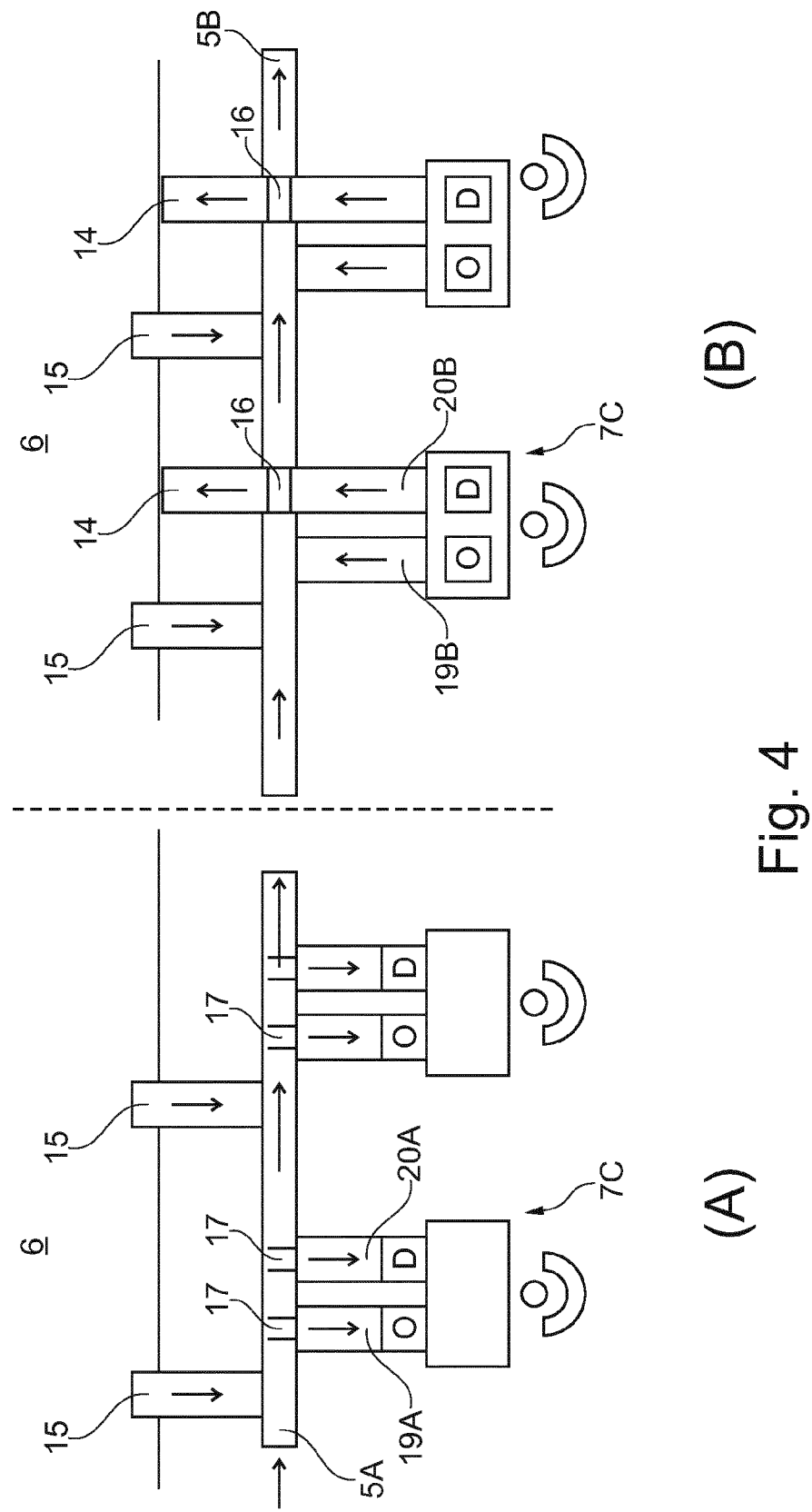
FIG. 4 shows a typical schematic plan view of a picking with a two level routing conveyor.

Alternatively, as depicted in FIG. 4, the routing conveyor 5 may have two levels 5A and 5B, i.e. one conveying level in each level A (left hand side) and B (right hand side). In level A the picking station 7C is supplied with order receptacles O and product receptacles D similar as above, but the servicing conveyors 19A and 20A are not directly aligned with the storage-exit conveyors 15 but are located downstream on the routing conveyor 5A and reachable by using RAT 17.

Level B is therefore used for dispatch of order receptacles O and product receptacles D from station 7C, by servicing conveyors 19B for order receptacles O and 20B for product or donor receptacles D on a higher level B (right hand side). Servicing conveyor 19B is not aligned with storage-entry conveyor 14 (in analogy to level A) but via RAT 16 downstream. In contrast servicing conveyor 20B is aligned with storage-entry conveyor 14. Therefore order receptacles O from station 7C may pass through RAT 16 and be conveyed downstream on routing conveyor 5, whereas product receptacles D can be directly routed back into storage. Also order receptacles O may be redirected by RAT 16 into storage.

The storage and picking described above therefore allows:
order receptacles containing completed orders coming from the manual storage and picking area II are dispatched via the routing conveyor 5 to the shipping area IV or introduced into the storage racking 6 of the automated second storage II via the at least one storage-entry conveyor for later dispatch;
order receptacles containing completed orders coming from the storage racking 6 of the automated second storage area II are dispatched via the routing conveyor 5 to the shipping area IV;
order receptacles containing completed orders coming from the semiautomatic picking station 7 of the automated second storage area II are dispatched via the routing conveyor 5 to the shipping area or introduced into the storage racking 6 of the automated second storage area II via the at least one storage-entry conveyor 14 for later dispatch;
order and/or batch receptacles containing partial orders coming from the manual storage and picking area III are introduced into the storage racking 6 of the automated storage area II via the at least one storage-entry conveyor 14 for further processing or introduced directly into the semi/full automatic pack station 7 for immediate processing;
order and/or batch receptacles containing partial orders coming from the semi/full automatic picking station 7 are introduced into the storage racking of the automated second storage and retrieved to semi/full automatic picking station 7 for further processing;

At least one lift 21 (FIG. 3A) is used for changing levels of the receptacles, in order to transfer the order and/or product receptacles to the at least one storage-exit conveyor 15 and to receive order and/or product receptacles from the storage-entry conveyor 14. Lift 21 may have more than one location for receptacles, in order to carry more than one receptacle at the same time. How many lifts 21 are used and how these are arranged depends on the specific implementation.

Figure 6:
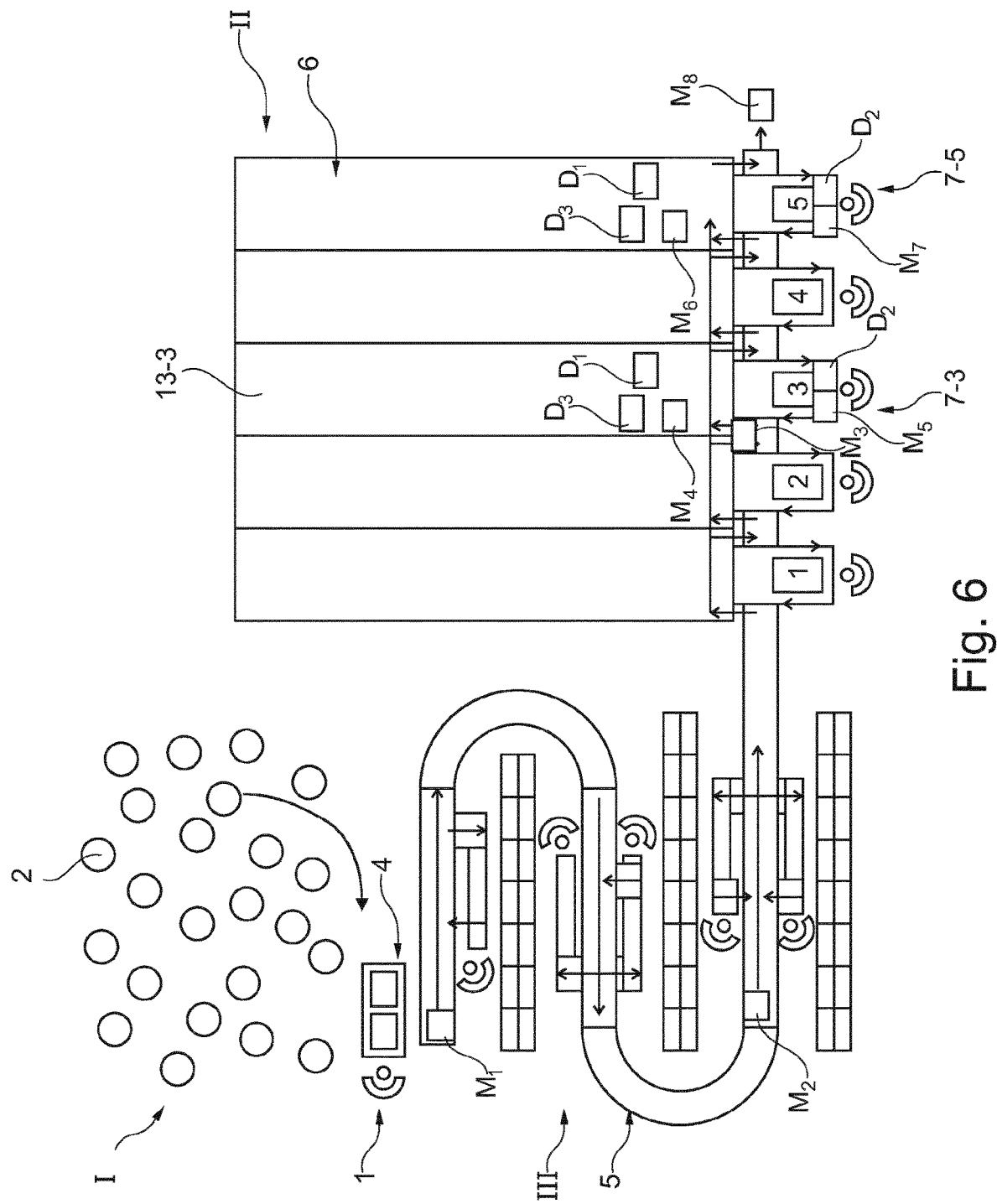
FIG. 6 is a schematic view of FIG. 5 indicating movement of the respective receptacles.

With reference to FIG. 6 an exemplary workflow in the arrangement according to FIG. 5 will be explained with respect to batch receptacles M and other donor receptacles D (obviously the same process is possible with single receptacles S). Their changing positions within the facility will be indicated by adding a number to their reference, e.g. M1, M2, M3, . . . ; D1, D2, D3, . . . etc.

At the unloading station 4 eight items from the mobile shelf 2 will be placed in the batch receptacle M by the picker 1 (start, M1) and directly inducted onto routing conveyor 5. Receptacle M is then transported on routing conveyor 5 (M2) passing through manual area II into the storage racking 6 (M3), as described above, where they it is buffered until needed, i.e. all items for a certain order are available within an aisle. In the present example the batch receptacle M is stored into aisle no. 3 (see reference M4), as it will be need at the corresponding pack station first. In this aisle 13-3 also donor receptacle D is stored, as its contents will be need at the same picking station 7 for the same order also.

Donor receptacle D is retrieved and transported to the picking station 7-3 (see reference D2), picked and then stored back into aisle 13-3 (see reference D3). Then the batch receptacle M is retrieved and transported to the picking station 7-3 (see reference M5) and the item for the order being processed at picking station 17-3 is picked. The corresponding order receptacle is not shown. Afterwards the batch receptacle M containing the last of the two original items is transported to aisle 13-5 (see reference M6), where its contents will be need next, either via cross conveyance locations Q or routing conveyor.

The processing sequence of those are usually not important except for the case specified by business rule (e.g. heavy goods should be picked before light goods for easy packing) or solution is to handle order receptacles.

The same procedure is then followed at picking station 7-5, see references D1, D2, D3 and M6, M7. Afterwards the batch receptacle M is depleted, i.e. empty and is dispatched via conveyor 5 and further conveying means back to unloading station 4 for further use.

Figure 7:
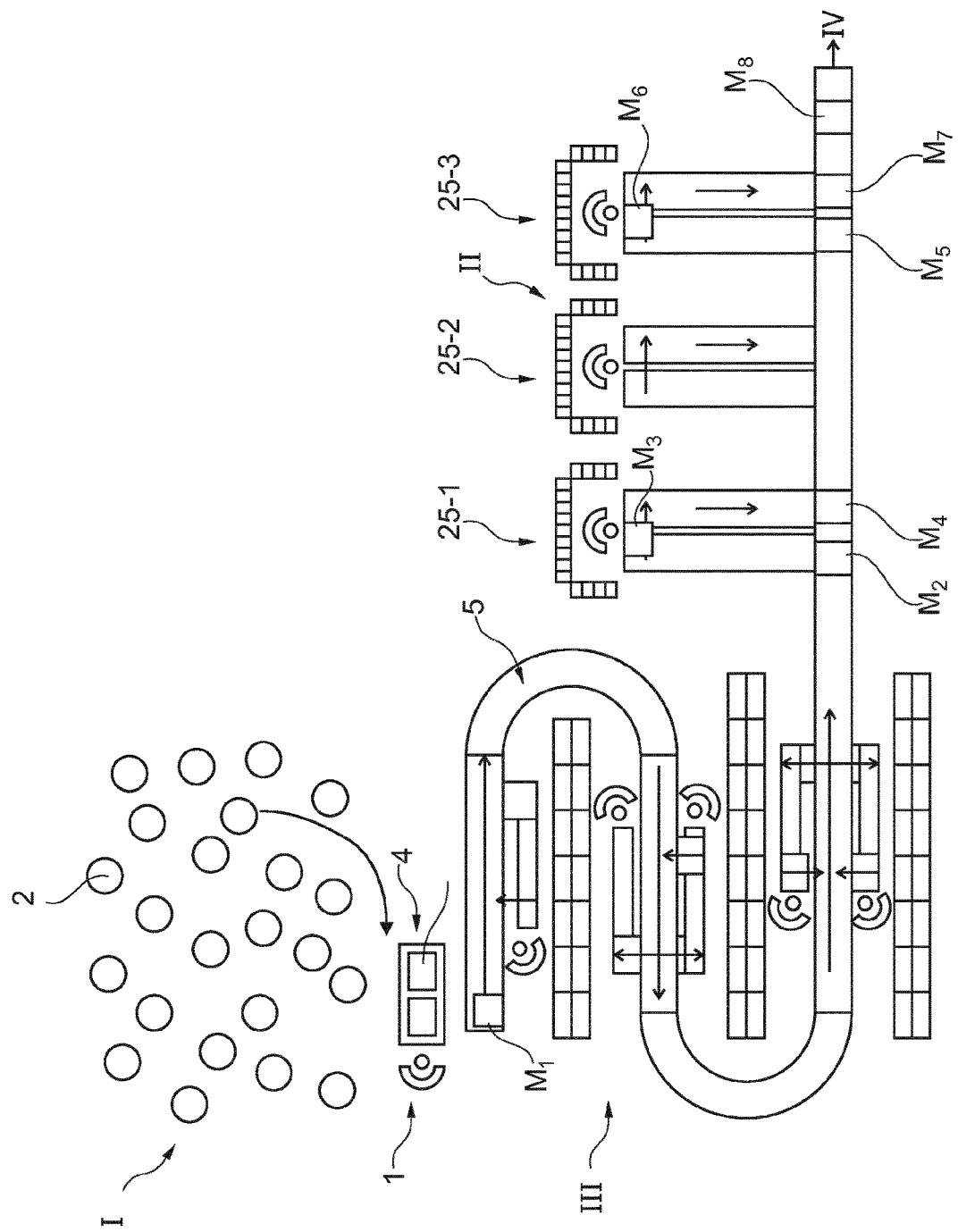
FIG. 7 shows a schematic plan view of a further order fulfillment area in warehouse with an order fulfillment area using put walls.

In the embodiment of FIG. 7 the picking stations 7 have a put wall configuration. In a similar manner to above the receptacles S, M are transported from the unloading station 4 to put walls 25 by conveyor 5 in the embodiment of FIG. 7. The batch receptacle M (used for ease of explanation; however single receptacles S are similarly useable) is first conveyed to put wall 25-1, where a first item is needed to fill a compartment of the put wall 25-1 corresponding to an order (see reference M2, M3). Then the batch receptacle M is conveyed past a second put wall 25-2 and on to a third put wall 25-3 for picking of the second item (see reference M5, M6). Afterwards the batch receptacle is empty and can be conveyed away (see reference M8), e.g. back to unloading station 4 for further use.

Figure 8:
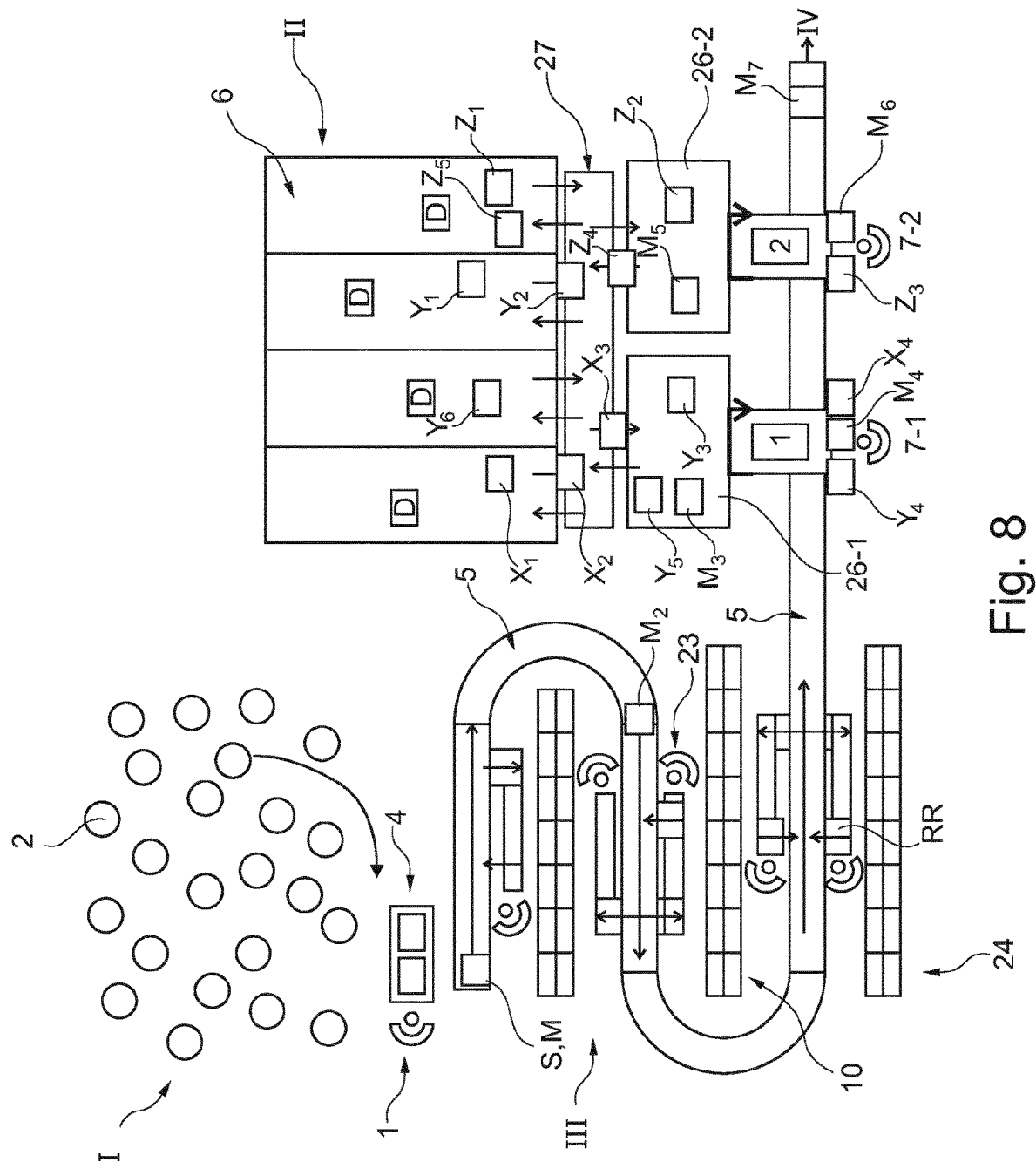
FIG. 8 shows a schematic plan view of a further embodiment of an order fulfillment area in warehouse comprising a sequencer and/or buffer.

In a similar manner as in FIG. 6 the batch receptacles M are transported from the unloading station 4 to sequencers 26 by conveyor 5 in the embodiment of FIG. 8. The two sequencers 26-1, 26-2 are connected to pack stations 7-1 and 7-2 respectively on one side and via a loop 27 to an automated storage 6, as described above.

First the batch receptacle M from the unloading station 4 is transported via conveyor 5 into the sequencer 26-1 (see reference M1, M2 and M3). At the same time/in parallel donor receptacle Y is retrieved from storage 6, as described above with reference to FIGS. 1-4, and transported via loop 26 to sequencer 26-1 (see reference Y1, Y2, Y3). In the sequencer 26-1 the donor receptacle Y is sorted to be sent to the pack station 7-1 first, where it is picked and then transported back to the sequencer and via loop 27 to storage 6 (see reference Y4, Y5, Y6). Afterwards the similar procedure is performed with batch receptacle M until all the order assigned to pack station 7-1 requiring batch receptacle M are fulfilled, after which it is transported on to sequencer 26-2 for further picking (see references M4 and M5). At the same time parallel donor receptacle X is retrieved from storage 6, as described above with reference to FIGS. 1-5, and transported via loop 26 to sequencer 26-1 and on to pack station 7-1 for picking (see references X1, X2, X3 and X4).

In the second sequencer 26-2 donor receptacle Z has been made available as described before for donor receptacles X and Y, in which it is sorted to first output and sent to pack station 7-2 for picking (see references Z1, Z2 and Z3). Afterwards it is then transported back to the sequencer and via loop 27 to storage 6 (see reference Z4 and Z5). While donor receptacle Z is being transported away batch receptacle M is transported to pack station 7-2 from the sequencer 26-2 and the last item is picked (see reference M6). Then it is empty and can be conveyed away (see reference M7).

The invention claimed is:

1. A method of fulfilling orders in a warehouse with an order fulfillment area comprising the steps:
    storing items in a first storage comprising mobile shelf units, wherein items are stored on the mobile shelf units until needed for order fulfillment;
    automatically transporting items needed for order fulfillment on said mobile shelf units from said first storage to an unloading station, where at least one of the items needed for a certain order is manually or automatically unloaded from the mobile shelf unit and directly transferred into a receptacle at the unloading station;
    routing of said receptacles from the unloading station directly to picking stations using a routing conveyor if needed right away, otherwise routing of said receptacles from the unloading station directly to a second automated storage being a three-dimensional racking by said routing conveyor and storage entry conveyors and storage of the receptacles therein by automated storage and retrieval systems, wherein said picking stations are put-walls and/or fully or semi-automated picking stations and/or automated palletizers; and
    retrieving, when all of the items to complete an order are available and/or are stored in said second automated storage, of the receptacles containing items for fulfillment of the certain order by said automated storage and retrieval systems and transporting to one of said picking stations for specific item retrieval for fulfilling said certain order by storage exit conveyors;
    wherein the items are unloaded and transferred into a receptacle for later use in order fulfillment in a single step.

2. The method as claimed in claim 1, wherein said mobile shelf units are autonomous automatic guided vehicles.

3. The method as claimed in claim 2, wherein two or more identical items are picked and directly placed into a same receptacle at the unloading station.

4. The method as claimed in claim 3, wherein two or more items belonging to the same aisle or area of the second storage are placed into the same receptacle at the unloading station.

5. The method as claimed in claim 3, wherein two or more items belonging to the same order are placed in each receptacle at the unloading station.

6. The method as claimed in claim 3, wherein receptacles not-emptied are routed to further picking stations.

7. The method as claimed in claim 1, wherein the mobile units carry only items of a single type.

8. The method as claimed in claim 1, wherein fast-moving items are stored in said second storage.

9. The method as claimed in claim 8, wherein the second storage comprises a three dimensional storage racking for storage of receptacles with shuttles servicing each aisle and preferably each level, wherein the shuttles themselves have load handling means which allow transfer of receptacles directly between adjoining racks by pushing or pulling the receptacles from a source rack location of a first rack to a destination rack location of an adjoining second rack.

10. The method as claimed in claim 9, wherein each aisle is connected to a picking station.

11. The method as claimed in claim 1, wherein the second storage comprises a sequencer or buffer.

12. The method as claimed in claim 1, wherein the unloading station and the second storage and/or the picking stations are connected by a routing conveyor.

13. The method as claimed in claim 1, wherein fast-moving items are supplied directly to replenishment stations for replenishment of donor receptacles by putting said fast-moving items directly into said donor receptacles.

14. The method as claimed in claim 13, wherein said replenishment stations are used for batch picking for order fulfillment by picking multiple fast-moving items directly into order receptacles.

15. The method as claimed in claim 1, wherein two or more identical items are picked and directly placed into a same receptacle at the unloading station.

16. The method as claimed in claim 1, wherein two or more items belonging to the same aisle or area of the second storage are placed into the same receptacle at the unloading station.

17. The method as claimed in claim 1, wherein two or more items belonging to the same order are placed in each receptacle at the unloading station.

18. The method as claimed in claim 1, wherein receptacles not-emptied are routed to further picking stations.

19. The method as claimed in claim 1, wherein said storing items in the first storage comprising shelf units comprises storing slow-moving items in the first storage.

20. The method as claimed in claim 19, wherein fast-moving items are stored in said second storage.

* * * * *